United States Patent [19]
Duke et al.

[11] Patent Number: 6,070,997
[45] Date of Patent: Jun. 6, 2000

[54] WATERPROOF VALVE STEM SAFETY LIGHT FOR VEHICLES

[75] Inventors: Mike A. Duke, Oklahoma City, Okla.; Gerald D. Reed, Independence, Mo.

[73] Assignee: MJM, Inc., Oklahoma City, Okla.

[21] Appl. No.: 09/243,653

[22] Filed: Feb. 3, 1999

[51] Int. Cl.7 .................................................... B60Q 1/00
[52] U.S. Cl. ........................... 362/500; 362/473; 362/267
[58] Field of Search .................................... 362/500, 473, 362/267

[56] References Cited

U.S. PATENT DOCUMENTS

| | | | |
|---|---|---|---|
| 2,097,357 | 10/1937 | Watts | 362/267 |
| 2,756,412 | 7/1956 | Harrington | 362/267 |
| 3,873,822 | 3/1975 | Garito | 362/267 |
| 4,800,469 | 1/1989 | Leon | 362/473 |
| 4,827,655 | 5/1989 | Reed | 43/17.5 |
| 4,847,735 | 7/1989 | Kawasaki | 362/473 |

*Primary Examiner*—Sandra O'Shea
*Assistant Examiner*—Ronald E. DelGizzi
*Attorney, Agent, or Firm*—Charles M. Kaplan

[57] ABSTRACT

A symmetrical safety light for wheeled vehicles is turned on by relative rotation of a removable plug in a housing that pushes a battery in the housing against the resistance of a spring. The light is turned off by relative rotation of the components in the opposite direction, which allows the spring to push the battery out of contact with a conductor from the light.

18 Claims, 3 Drawing Sheets

WATERPROOF VALVE STEM SAFETY LIGHT FOR VEHICLES

BACKGROUND OF THE INVENTION

This invention relates to safety lights for wheeled vehicles, and more particularly to a light that can be easily attached to the valve stem of a tire.

Prior valve stem lights were not always completely waterproof at the speeds to which they were subjected when vehicle tires rotate. Entry of water could cause the electrical components to short circuit and thereby turn the light on when it should be off or off when it should be on. Also, electrical circuit components could be damaged or corroded by entry of moisture or a water leak.

Valve stem lights on rotating tires are subjected to substantial centrifugal and G forces coming from varying directions as the vehicle speeds up and slows down and when the vehicle turns and swerves. These forces can cause an electric circuit to malfunction by moving parts such as switch contacts or battery terminals in relation to each other. Also, non-symmetrical tire light assemblies may vibrate when the tire is rotating and thereby cause excessive wear on their parts and fatigue stresses on the valve stem.

OBJECTIVES OF THE INVENTION

Accordingly, it is an object of this invention to provide improved vehicle safety lights.

Another object is to provide valve stem lights that are water tight at the speeds at which ordinary land vehicle tires rotate.

Another object is to provide valve stem lights that are attractive in appearance and add distinctiveness to vehicles on which they are used.

An additional object is to provide valve stem lights that do not malfunction because their parts can be moved by centrifugal and other motion induced G forces.

Another object is to provide valve stem lights that are easy to turn on and off, but that remain either on or off after they have been activated or deactivated.

Another object is to provide valve stem lights that do not vibrate excessively when a vehicle is in motion.

A further object is to provide transparent, highly visible valve stem lights for bicycles and autos that are rugged, economical, easy to install and maintain, and which do not possess defects found in similar prior art safety lights.

Other objects and advantages of the safety lights incorporating this invention will be found in the specification and claim and the scope of the invention will be set forth in the claim.

DESCRIPTION OF THE INVENTION

Figure 1:
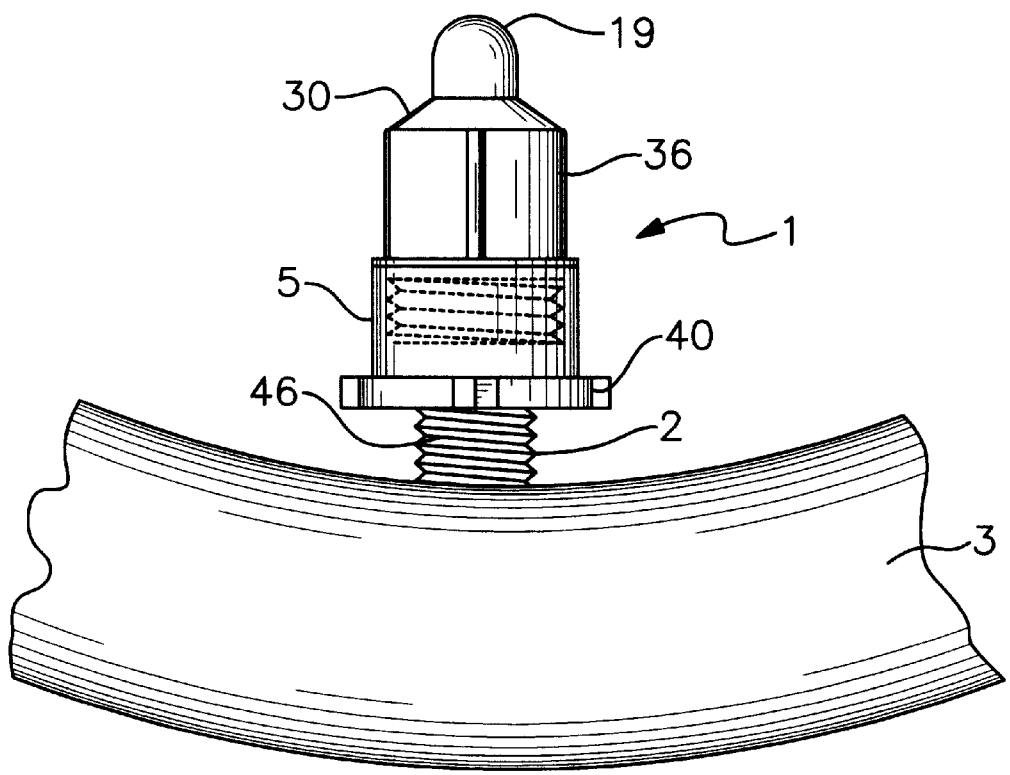
FIG. 1 is a perspective partial view of a vehicle wheel having an embodiment of the invention attached thereto.
Figure 2:
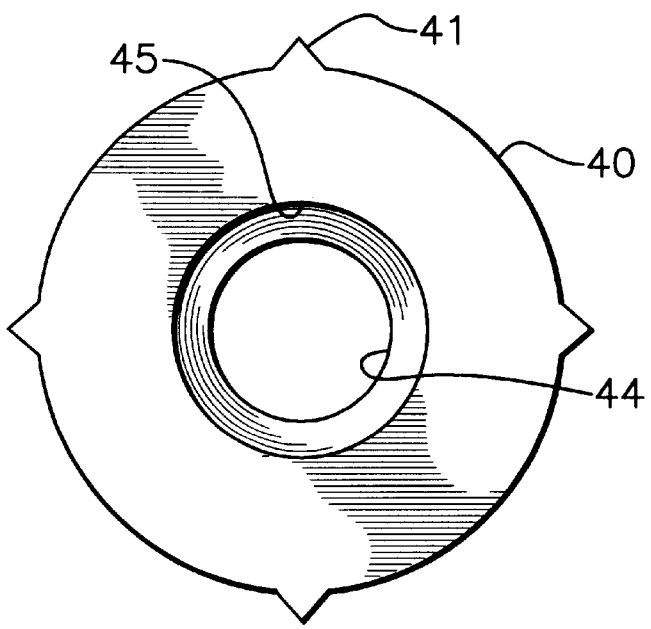
FIG. 2 is a bottom view of that embodiment of the invention.
Figure 3:
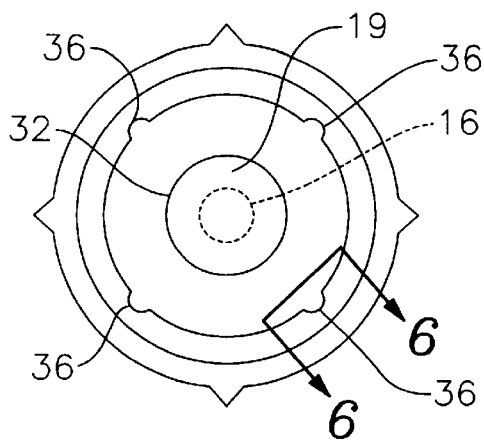
FIG. 3 is a top view of that embodiment.
Figure 4:
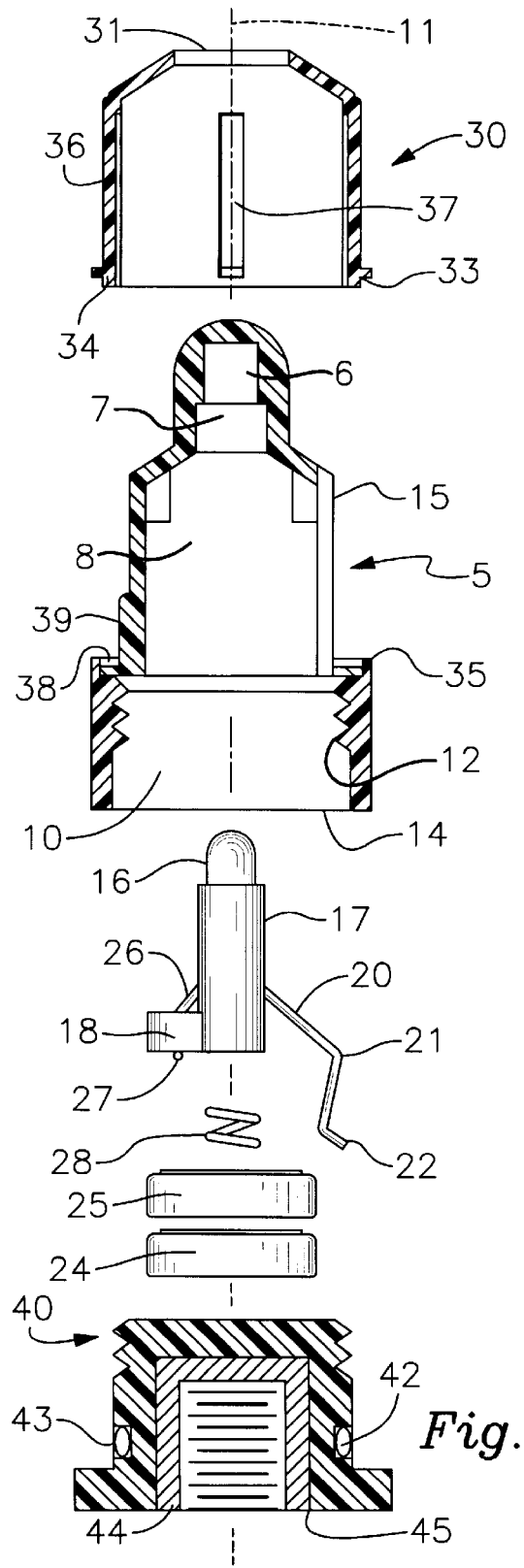
FIG. 4 is an exploded partially cross sectional side view of that embodiment.
Figure 5:
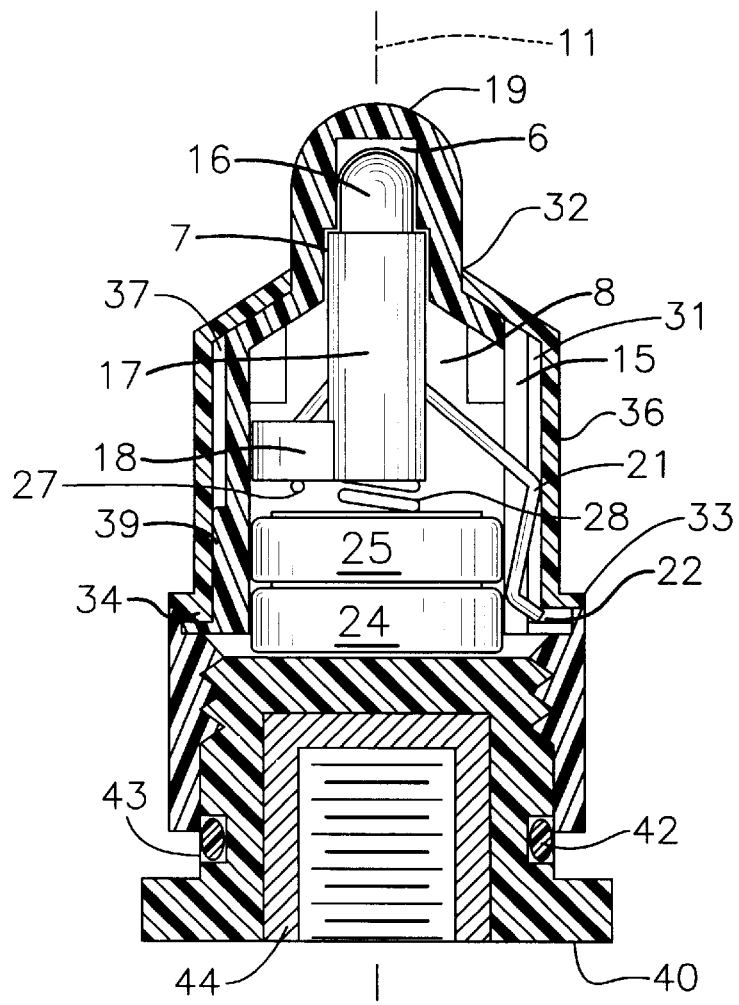
FIG. 5 is an enlarged partially cross sectional side view of that embodiment.

The drawing shows a transparent water proof safety light 1 in accord with this invention that is attached to the valve stem 2 of the tire 3 of a vehicle such as a bicycle, automobile or trailer. The light 1 includes a transparent plastic cylindrical inner housing 5 having a cylindrical apex chamber 6, a cylindrical upper chamber 7, a cylindrical intermediate chamber 8, and a cylindrical lower chamber 10. All of the chambers is housing 5 are axially aligned with each other and centered on the longitudinal central axis 11 of the light 1. The apex chamber 6 communicates directly with the upper chamber 7, and the upper chamber 7 communicates directly with the intermediate chamber 8. The lower chamber 10 and the intermediate chamber 8 communicate directly with each other, and the lower chamber has internal threads 12 adjacent its open end 14. An elongated vertical slit 15 passes through through the wall of the inner housing 5 and communicates with the inside of the intermediate chamber 8.

A light source, such as a small, brilliant, colored, highly visible, shock resistant light emitting diode 16, is mounted in a generally cylindrical plastic holder 17 which is stabilized by an integral wing 18. The holder 17 has its upper end rigidly secured in the upper chamber 7, and the lower end of holder 17 extends into the intermediate chamber 8. Diode 16 extends into the apex chamber 6. The curved, generally hemispherical, outer end 19 of housing 5 surrounding apex chamber 6 acts as a lens and deflector for dispersing the light rays emitted by diode 16 both internally and externally of the light 1.

A first wire conductor 20 from the diode 16 passes through the side of plastic holder 17 and extends into the vertical slit 15. An intermediate portion at 21 and the terminal end 22 of conductor 20 are bent to ensure that the conductor will make proper contact with a battery in the light 1. The bends in conductor 20 at 21 and 22 will cause one or more parts 23 of the conductor 20 to extend through slit 15 beyond the outer wall or surface of the inner housing 5. The conductor 20 will touch the positive terminal of only the lower battery 24 of a pair of identical small cylindrical batteries in chamber 8 which provide the current for energizing diode 16. A second conductor 26 passes through the wing 18 of holder 17, and its terminal end portion 27 rests against the bottom of wing 18. Conductor 26 will be contacted by the negative terminal of the upper battery 25. The batteries are centered on and axially movable in chamber 8 along the central axis 11. A small coil spring 28 is located between the bottom of plastic holder 17 and the batteries 24 and 25. The spring 28 is centered on axis 11 and biases the batteries away from the end 27 of conductor 26. The batteries 24 and 25 may, for example, be Energizer 76A cells.

Safety light 1 includes a cylindrical plastic outer sleeve 30 having an upper opening 31 that receives the outer end 19 of inner housing 5. The apex chamber 6 and some of upper chamber 7 extend through the opening 31 beyond the sleeve 30. An ultrasonic weld at 32 between sleeve 30 and end 19 provides a waterproof seal. The outer sleeve 30 has an open bottom surrounded by an outwardly projecting circular peripheral ledge 33 and a circular downward projecting ridge 34. The ledge 33 is secured to an upstanding circular rim 35 on inner housing 5, and the ledge 34 is secured in a circular groove 38 in the housing 5 by additional ultrasonic welds to provide additional waterproof seals.

Figure 6:
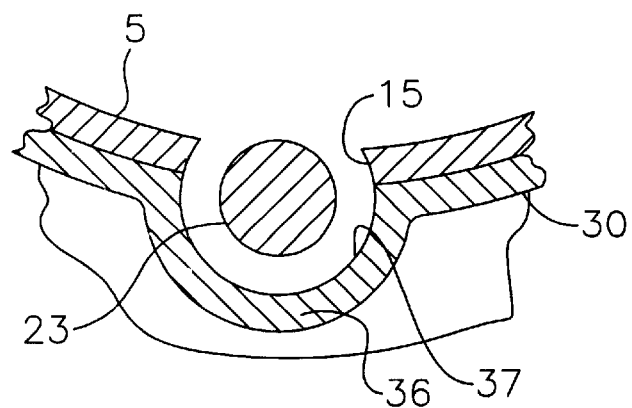
FIG. 6 is an enlarged cross sectional view taken generally along the line 6—6 in FIG. 3.

The outer sleeve 30 has four symmetrically spaced outer vertical blisters 36 each of which defines a vertical trough 37 on the inside surface of the sleeve. The troughs 37 are diametrically aligned in pairs. As shown in FIG. 6, one of the vertical troughs 37 is aligned with the vertical slit 15 in the inner housing 5 to receive the part 23 of wire 20 that extends beyond the outer surface of the inner housing. The housing 5 has a short vertical boss 39 that is located diametrically opposite to the slit 15. Boss 39 is dimensioned to mate with the troughs 37 so that when one trough 37 slips over the boss 39, its diametrically opposite trough 37 will be in the proper position for alignment with the slit 15. The part 23 of first conductor 20 that passes beyond the inner housing 5 extends into the vertical trough 37 that is aligned with slit 15. Sleeve 30 may be either transparent or translucent.

A removable rotatable plug 40 has external threads mating with the threads 12 in the lower chamber 10. Relative rotation of the plug 40 and housing and sleeve assembly in one direction around the longitudinal central axis 11 will advance the plug and thereby move the batteries 24 and 25 inwardly axially along the longitudinal central axis against the bias of spring 28. Continued rotation in such direction will eventually move the batteries into contact with the conductor 20 and end 27, which will turn on the diode 16. Relative relative rotation of the plug and assembly in the opposite direction will allow the spring 28 to push the batteries outwardly axially along the axis 11 out of contact with the conductors and this will turn off the diode. The diode 16 can also be turned on or off by holding the housing and sleeve assembly stationary and rotating the plug 40, or by holding the plug 40 stationary and rotating the assembly. These alternative methods of turning the diode 16 on or off may be useful when valve stem 2 and plug 40 are screwed together either to tightly or too loosely. Points 41 may be provided on the plug to facilitate gripping the plug when it is wet or slippery from road grime.

An O-ring 42 in a peripheral groove 43 around plug 40 will be compressed between the plug and the lower chamber 10. This provides a waterproof seal between the plug and the inner housing 5. Although the plug 40 and housing and sleeve assembly are easily turnable, the external threads on plug 40 and the threads 12 are dimensioned to cause a relatively tight fit. To attach the safety light 1 to a vehicle tire stem 2, the plug has a threaded brass insert 44 in its center hole 45 for mating with threads 46 on the vehicle tire valve stem 2. The plastic parts of the light 1 may be made from an impact resistant polycarbonate.

It has thus been shown that by the practice of this invention, a vehicle valve stem safety light 1 can be sealed so that it is completely waterproof at the speeds of conventional land vehicles. The components of the light 1 are essentially symmetrically located with respect to its longitudinal central axis 11, and this minimizes vibration of the light assembly and fatigue stresses on the valve stem 2. The battery 25 can not be moved into contact with conductor end 27 by centrifugal and other G forces because the spring 28 pushes the batteries axially away from the holder 17. The tight frictional engagement between the threads on the plug 40 with the threads 12 and the compression of O-ring 42 ensure that the light will stay on after diode 16 has been energized. Blisters 36 have several functions in that the blisters provide extra space required to accommodate the bends 21 and 22 in conductor 20. The blisters 36 also makes the outside of the light housing assembly easy to grip when it is wet or fouled by road grime, and the blisters also disperse light from the diode 16 in additional directions. The light 1 has a unique appearance because the lens effect of the hemispherical end 19 reflects light rays into the lower chamber 10 where the light rays pass through the threads 12 and appear as rings around the light body.

While the present invention has been described with reference to a particular embodiment, it is not intended to illustrate or describe all of the equivalent forms or ramifications thereof. Also, the words used are words of description rather than limitation, and various changes may be made without departing from the spirit or scope of the invention disclosed herein. For example the words like upwardly and downwardly are used for making relative comparisons when the invention is oriented as illustrated in the drawing. It is intended that the appended claims cover all such changes as fall within the true spirit and scope of the invention.

What we claim as new and desire to secure by Letters Patent of the United States is:

1. A waterproof safety light for vehicles, comprising:
   a transparent cylindrical housing having a closed upper end and an open threaded lower end, a light source having positive and negative sides mounted in said upper end of said housing, said light source having conductors connected to its positive and negative sides,
   a battery having positive and negative sides in said housing, said battery being movable within said housing into and out of contact with said conductors for turning said bulb on and off, a removable rotatable plug having threads mating with threads in said lower end of said housing, relative rotation of said plug and housing in one direction advancing said plug in said housing and moving said battery into contact with said conductors for turning on said light source, and relative rotation of said plug and housing in the opposite direction retracting said plug and causing said battery to move out of contact with said conductors, a waterproof seal between said plug and said housing, and said removable plug having a threaded center hole for mating with threads on a vehicle tire valve stem for attaching said safety light to a vehicle.

2. The waterproof safety light for vehicles defined in claim 1, wherein said transparent cylindrical housing has a longitudinal central axis, said plug and housing are rotatable around said axis and said battery is movable axially along said axis into and out of contact with said conductors, relative rotation of said plug and housing in opposite directions around said axis moving said battery axially along said axis into and out of contact with said conductors.

3. The waterproof safety light for vehicles defined in claim 1, further comprising a spring located between said battery and one of said conductors for biasing said battery out of contact with said conductor, relative rotation of said plug and housing in said one direction moving said battery to compress said spring and contact said one conductor.

4. The waterproof safety light for vehicles defined in claim 1, further comprising said open lower end of said housing having internal threads, the mating threads on said plug being external threads, and said waterproof seal being an O-ring compressed between said plug and said housing.

5. The waterproof safety light for vehicles defined in claim 1, further comprising said cylindrical housing having a vertical slit therethrough, one of said conductors passing through said slit beyond said housing, and a cylindrical outer sleeve surrounding said housing, said one of said conductors extending into said sleeve, and said sleeve providing a waterproof seal for said slit.

6. The waterproof safety light for vehicles defined in claim 5, further comprising said sleeve having an outer vertical blister that defines a vertical trough inside of said sleeve, said trough being aligned with said slit in said housing, and said one of said conductors extending into said trough.

7. The waterproof safety light for vehicles defined in claim 6, wherein said one of said conductors that extends into said trough contacts the positive side of said battery when said light source is lit.

8. The waterproof safety light for vehicles defined in claim 1, further comprising said housing having a cylindrical apex chamber, a cylindrical upper chamber, a cylindrical intermediate chamber, and said threaded lower end being a cylindrical lower chamber, said apex chamber opening into said upper chamber, said upper chamber opening into said intermediate chamber, said intermediate chamber opening into said lower chamber, said light source being mounted in a plastic holder, said light source and plastic holder being secured in said apex and upper chambers, said battery being in said intermediate chamber, and said plug being in said lower chamber.

9. The waterproof safety light for vehicles defined in claim 8, further comprising there being a vertical slit through said housing communicating with said intermediate chamber, one of said conductors having a portion extending through said slit beyond said housing, and a waterproof seal around said slit.

10. The waterproof safety light for vehicles defined in claim 9, wherein said waterproof seal comprises an outer sleeve surrounding said housing.

11. The waterproof safety light for vehicles defined in claim 10, further comprising said outer sleeve having an outer vertical blister that defines a vertical trough on its inside surface, said vertical trough being aligned with said vertical slit, and said portion of said one of said conductors extends into said trough.

12. A waterproof safety light for vehicles comprising:
a transparent cylindrical housing having a longitudinal central axis, a cylindrical apex chamber, a cylindrical upper chamber, a cylindrical intermediate chamber, and a threaded cylindrical lower chamber, said apex chamber communicating with said upper chamber, said upper chamber communicating with said intermediate chamber, and said intermediate chamber communicating with said lower chamber, a light emitting diode mounted in a cylindrical plastic holder, said light emitting diode extending into said apex chamber, said plastic holder having its upper end secured in said upper chamber and its lower end extending into said intermediate chamber, first and second conductors from said diode passing through said plastic holder, a battery in said intermediate chamber and a spring between said battery and said housing for biasing said battery away from at least one of said conductors, said battery being movable axially along said longitudinal central axis, a removable rotatable plug having external threads mating with the threads in said lower chamber, relative rotation of said plug and housing in one direction around said longitudinal central axis advancing said plug and moving battery axially along said longitudinal central axis against the bias of said spring into contact with said one of said conductors for turning on said light emitting diode, and relative rotation of said plug and housing in the opposite direction around said longitudinal central axis allowing said spring to push said battery axially along said longitudinal central axis out of contact with said one of said conductors for turning off said light emitting diode, an O-ring compressed between said plug and said lower chamber, said O-ring providing a waterproof seal between said plug and said lower chamber, and said threaded plug having a threaded center hole for mating with threads on a vehicle tire valve stem for attaching said safety light to a vehicle.

13. The waterproof safety light for vehicles defined in claim 12, further comprising there being an elongated vertical slit through said housing communicating with said intermediate chamber, a conductor from said light emitting diode passing through said plastic holder and extending into said vertical slit in said housing, at least a part of said conductor extending through said vertical slit beyond said housing.

14. The waterproof safety light for vehicles defined in claim 13, further comprising a cylindrical outer sleeve having an upper opening receiving said housing with said apex and upper chambers extending through said upper opening beyond said outer sleeve, there being a waterproof seal between said upper opening and said housing, said outer sleeve having an open bottom surrounded by a peripheral rim, said rim being secured to said housing in a waterproof manner, and said outer sleeve preventing water from entering said housing through said vertical slit.

15. The waterproof safety light for vehicles defined in claim 14, further comprising said outer sleeve having an outer vertical blister that defines a vertical trough on its inside surface, said vertical trough being aligned with said vertical slit in said housing, and said part of said conductor passing beyond said housing extending into said vertical trough.

16. The waterproof safety light for vehicles defined in claim 15, further comprising a ridge on the outside of said housing located diametrically opposite to said slit, and another blister on said outer sleeve defining another vertical trough located diametrically opposite to the first mentioned trough, the other vertical trough mating with said ridge for positioning said first mentioned trough in alignment with said slit.

17. The waterproof safety light for vehicles defined in claim 15, further comprising said conductor that extends into said trough contacting the positive side of said battery.

18. transparent waterproof safety light for vehicles comprising:
a transparent cylindrical inner housing having a longitudinal central axis, a cylindrical apex chamber, a cylindrical upper chamber, a cylindrical intermediate chamber, and a threaded cylindrical lower chamber, said apex chamber communicating with said upper chamber, said upper chamber communicating with said intermediate chamber, and said intermediate chamber communicating with said lower chamber, there being an elongated vertical slit through said inner housing communicating with said intermediate chamber, a light emitting diode having a positive and negative side mounted in a cylindrical plastic holder having an upper end and a lower end, said light emitting diode extending into said apex chamber, said plastic holder having its upper end secured in said upper chamber and its lower end extending into said intermediate chamber, a first conductor from the positive side of said light emitting diode passing through said plastic holder and extending into said vertical slit in said inner housing, at least a part of said first conductor extending through said vertical slit beyond said inner housing, a second conductor from the negative side of said light emitting diode passing through said plastic holder, a transparent cylindrical outer sleeve having an upper opening receiving said inner housing with said apex and upper chambers extending through said upper opening beyond said outer sleeve, there being a waterproof seal between said upper opening and said inner housing, said outer sleeve having an open bottom surrounded by a peripheral rim, said rim being secured to said inner housing in a waterproof manner, said outer sleeve having an outer vertical blister that defines a vertical trough on its inside surface, said vertical trough being aligned with said vertical slit in said inner housing, and said part of said first conductor passing beyond said inner housing extending into said vertical trough, a battery in said intermediate chamber and a coil spring between said battery and said plastic housing for biasing said battery away from at least one of said conductors, said battery being movable axially along said central axis, a removable rotatable plug having external threads mating with the threads in said lower chamber, relative rotation of said plug in said lower chamber and housing in one direction around said longitudinal central axis advancing said plug and moving said battery upwardly axially along said longitudinal central axis against the bias of said spring into contact with said conductors for turning on said light emitting diode, and relative rotation of said plug in the opposite direction around said longitudinal central axis allowing said spring to push said battery downwardly axially along said longitudinal central axis out of contact with said conductors for turning off said light emitting diode, an O-ring compressed between said plug and said lower chamber, said O-ring providing a waterproof seal between said plug and said lower chamber, and said threaded plug having a threaded center hole for mating with threads on a vehicle tire valve stem for attaching said safety light to a vehicle.

* * * * *